UNITED STATES PATENT OFFICE.

CARL LÖWIG, OF BRESLAU, PRUSSIA, GERMANY.

PROCESS OF MANUFACTURING CAUSTIC ALKALIES.

SPECIFICATION forming part of Letters Patent No. 274,619, dated March 27, 1883.

Application filed October 20, 1882. (No specimens.) Patented in France September 14, 1882, No. 151,086, and in Belgium September 14, 1882, No. 59,019.

*To all whom it may concern:*

Be it known that I, CARL LÖWIG, of Breslau, Kingdom of Prussia, German Empire, have invented an Improvement in the Process of Manufacturing Caustic Alkalies, of which the following is a specification.

If a mixture of carbonate of soda or carbonate of potash with oxide of iron is exposed to a very high heat, a chemical compound or combination is obtained, while carbonic acid is developed of oxide of iron with soda or potash, which compound or combination, if treated with water, is decomposed into caustic soda or caustic potash (which are dissolved in the water) and into oxide of iron. On these facts my improved process is based for manufacturing on a large scale and for industrial purposes caustic alkalies.

My process is noted for the simplicity and facility of its working, inasmuch as the caustics or lyes gained by it are ready for immediate evaporation without any intermediate operation, and the oxide of iron regained may be reused for the next process.

The first condition for working according to my process is to have pure or nearly pure oxide of iron, whether artificial or natural. The same should not contain either alumina or silica. A small percentage of chalk or magnesia is without any injurious influence.

I have ascertained by numerous experiments that for the manufacturing of caustic alkalies a mixture of one molecule of carbonate of potash or soda with two molecules of oxide of iron will produce the best result. The oxide of iron may be employed either finely granulated—such as sand—or as a finely-ground powder. In both cases the mixture must be made as thoroughly as possible. The heating or furnacing of the mixture is preferably made in iron cylinders or retorts, similar to those which are used in gas-works, and the heating of the same is done in the similar manner. The heat must be raised up to bright cherry heat.

In manufacturing pure caustic alkalies it is advisable to heat twice and to regrind and sift the mixture again after the first heating. The active heating must be continued for about one hour, or for such a period that a trial with diluted acid will produce no effervescence. Heating in cylinders, at all events, is to be preferred to heating in an open oven or in a bauxite oven; but care must be taken that the cylinder is perfectly filled with the mixture and is brought uniformly in its entire length up to bright cherry heat. If the oxide of iron is pure, the mixture will stand a very high temperature without becoming soft or scorificating. This will not be the case if the oxide of iron contains ten to twelve per cent. of silica. The lixiviation of the heated mass is preferably effected in a vessel provided with a stirring or agitating apparatus with iron blades and having pipes for the admission of steam. In manufacturing on an enlarged scale it is preferable to employ two such vessels for alternate use. The vessel is first filled with hot water or with diluted lye up to two-thirds or three-quarters of its bulk, and hereinto the mass, after the same has undergone the heating process, is introduced. During this adding of the mass into the water or lye the agitating or stirring apparatus must be continuously and rapidly worked, and steam must be admitted. The addition of the material is stopped if the lye has arrived at the desired degrees shown by the areometer. Stirring must be continued for, say, half an hour or three-quarters of an hour, and the temperature must be kept up to 90° Celsius, (194° Fahrenheit.) The agitator is now stopped, and after about one quarter or half an hour the clear lye is drawn off into an iron vessel for settling until the lye has arrived at perfect clearness. It is advisable to ascertain before evaporation of the lye whether any iron is contained in it, which is done by adding to a small quantity of it a few drops of a solution of hydrosulphuret of ammonia. The presence of iron will by this addition be demonstrated by a dark color, and in this case the lye has to remain still for some time in a warm state. If the solutions of caustic alkalies still contain small quantities of carbonic acid, the latter may be removed by carefully adding caustic baryte. The oxide of iron remaining and regained after the lixiviation is more or less of a dark color, and will always contain a small portion of protoxide and a small per cent. of soda, because the lixiviation cannot be continued for a long period, and the lyes become too much diluted. Therefore, in reusing the oxide of iron its quantity must be increased in proportion to the soda or potash. In general, it should be maintained as a principle not to spare the oxide of iron. Too much of it will do no harm, and the same will never be lost. It is therefore advisable to ascertain by a sample trial of the furnacing-mixture whether a product free from carbonic acid can be obtained. If this is not the case after repeated strong glowing or heating, the quantity of oxide of iron must be increased in proportion. It is obvious that in the production of caustic alkalies but little loss of alkali can take place, as the small quantity of soda remaining with the oxide of iron after lixiviation will come into use while re-employing the latter; but a loss of, say, four to six per cent. may ultimately arise.

I am aware that caustic soda has been manufactured from sulphuret of sodium by mixture with metallic oxide, furnacing, and subsequent lixivation. I therefore do not claim the same.

I claim—

The method of manufacturing caustic soda and caustic potash by heating or furnacing a mixture of carbonate of soda or carbonate of potash and oxide of iron and subsequent lixiviation, substantially as described.

This specification signed by me this 12th day of August, 1882.

CARL LÖWIG.

Witnesses:
WILHELM WIESENHÜTTER,
MARTIN KÖRNER.